(12) United States Patent
Mueller

(10) Patent No.: US 10,730,730 B2
(45) Date of Patent: Aug. 4, 2020

(54) COVER ASSEMBLY FOR BASKET OF AERIAL WORK PLATFORM

(71) Applicant: MCF Distributing, LLC, Mill Creek, WA (US)

(72) Inventor: Mark S. Mueller, SeaTac, WA (US)

(73) Assignee: MCF Distributing, LLC, Mill Creek, WA (US)

( * ) Notice: Subject to any disclaimer, the term of this patent is extended or adjusted under 35 U.S.C. 154(b) by 133 days.

(21) Appl. No.: 16/038,174

(22) Filed: Jul. 17, 2018

(65) Prior Publication Data

US 2019/0023549 A1 Jan. 24, 2019

Related U.S. Application Data

(60) Provisional application No. 62/534,190, filed on Jul. 18, 2017.

(51) Int. Cl.
*B66F 13/00* (2006.01)
*B66F 11/04* (2006.01)
(Continued)

(52) U.S. Cl.
CPC .............. *B66F 13/00* (2013.01); *B66F 11/04* (2013.01); *B66F 17/006* (2013.01); *B29C 65/04* (2013.01); *B29C 66/729* (2013.01); *B66F 11/044* (2013.01)

(58) Field of Classification Search
CPC ........ B66F 13/00; B66F 11/04; B66F 11/044; B66F 17/006; E04H 15/001; E04H 15/18; E04H 15/32; E04H 15/56; E04H 15/003; E04H 15/58; A47D 9/005; A47D 9/02; A47D 13/06; A47D 13/063; A47D 7/00; B65D 25/14; B65D 25/02; B65D 25/16; B65D 88/1606; B65D 88/1612; B65D 88/1618; B65D 37/00; B65F 1/06; B65F 1/068
USPC ........... 220/9.1, 9.4, 495.01, 495.06, 495.08, 220/495.1, 495.11; 150/165, 154, 900, 150/901; 383/2
See application file for complete search history.

(56) References Cited

U.S. PATENT DOCUMENTS 505,688 A * 9/1893 Wendell ................ B65D 29/00
383/76
3,599,690 A * 8/1971 Christie ................ B65D 33/28
383/15

(Continued)

*Primary Examiner* — Katherine W Mitchell
*Assistant Examiner* — Shiref M Mekhaeil
(74) *Attorney, Agent, or Firm* — Clements Bernard Walker

(57) ABSTRACT

Disclosed embodiments include cover assemblies for baskets of aerial work platforms and methods of fabricating a cover assembly for a basket of an aerial work platform. In an illustrative embodiment given by way of non-limiting example, a cover assembly for a basket of an aerial work platform includes a flexible cover. The flexible cover includes an interior guardrail portion and an exterior guardrail portion. The interior guardrail portion is configured to be received adjacent an interior surface of a guardrail of a basket of an aerial work platform. The exterior guardrail portion surrounds the interior guardrail portion, and the exterior guardrail portion is configured to be received adjacent an exterior surface of a guardrail of a basket of an aerial work platform. A retrieval mechanism is configured to draw the exterior guardrail portion toward the interior guardrail portion.

9 Claims, 14 Drawing Sheets

(51) Int. Cl.
*B66F 17/00* (2006.01)
*B29C 65/00* (2006.01)
*B29C 65/04* (2006.01)

(56) References Cited

U.S. PATENT DOCUMENTS

| | | | | |
|---|---|---|---|---|
| 3,827,471 A * | 8/1974 | Gregory | B65D 88/1612 | 222/181.3 |
| 4,143,796 A * | 3/1979 | Williamson | B65D 88/1612 | 222/181.3 |
| 4,194,652 A * | 3/1980 | Williamson | B65D 88/1612 | 112/418 |
| 4,747,701 A * | 5/1988 | Perkins | B65D 5/60 | 383/33 |
| 4,852,194 A * | 8/1989 | Langan | A47D 15/005 | 5/427 |
| 4,867,328 A * | 9/1989 | McCarthy | B65F 1/0046 | 220/533 |
| 4,989,994 A * | 2/1991 | Gelbard | B65D 33/00 | 206/554 |
| 5,104,133 A * | 4/1992 | Reiner | A01G 20/30 | 280/19 |
| 5,120,138 A * | 6/1992 | Midgley | B65D 25/16 | 220/495.11 |
| 5,213,141 A * | 5/1993 | Dorman | B65F 1/0006 | 141/10 |
| D345,122 S * | 3/1994 | Lloyd | D12/221 | |
| 5,340,218 A * | 8/1994 | Cuthbertson | B65D 88/1668 | 206/600 |
| 5,452,973 A * | 9/1995 | Arvin | B60P 7/0876 | 410/117 |
| 5,615,769 A * | 4/1997 | Stephenson | A45C 15/00 | 206/315.9 |
| 5,688,052 A * | 11/1997 | Compton | A45C 3/10 | 383/38 |
| 6,019,243 A * | 2/2000 | Marino | B65D 90/24 | 220/573 |
| 6,079,934 A * | 6/2000 | Beale | B65D 88/1612 | 294/68.1 |
| 6,155,772 A * | 12/2000 | Beale | B65D 88/1612 | 294/68.1 |
| 6,296,138 B1 * | 10/2001 | Hannah | B65D 25/16 | 150/112 |
| 6,305,567 B1 * | 10/2001 | Sulpizio | B65D 25/16 | 220/495.01 |
| 6,315,143 B1 * | 11/2001 | Dotts | B65F 1/1415 | 220/6 |
| 6,434,767 B1 * | 8/2002 | Welsh, Jr. | A47D 7/04 | 5/93.2 |
| 6,578,211 B2 * | 6/2003 | Tharalson | A47D 5/00 | 5/655 |
| 6,687,927 B1 * | 2/2004 | Tharalson | A47D 13/06 | 220/495.01 |
| 6,799,337 B1 * | 10/2004 | Raphael-Davis | A47D 7/00 | 5/658 |
| 6,986,621 B2 * | 1/2006 | Allard | B01D 29/27 | 405/36 |
| 7,267,369 B2 * | 9/2007 | Gallagher | B62B 3/0612 | 150/166 |
| 7,404,219 B2 * | 7/2008 | Berkey | A47C 21/046 | 5/655 |
| 8,100,280 B1 * | 1/2012 | Hernandez | D06F 95/002 | 206/278 |
| 8,435,311 B2 * | 5/2013 | Hartman | C11D 17/04 | 383/26 |
| 8,544,922 B1 * | 10/2013 | Huzar | B60P 7/0876 | 294/157 |
| 8,689,379 B2 * | 4/2014 | Cicci | A47D 15/008 | 5/424 |
| 8,955,174 B1 * | 2/2015 | Lawlor | A47D 13/063 | 5/93.1 |
| 8,955,898 B2 * | 2/2015 | Bemis | B60P 1/64 | 296/39.2 |
| 9,332,860 B2 * | 5/2016 | Rong | A47D 13/063 | |
| 9,586,726 B1 * | 3/2017 | Moody | B65D 33/28 | |
| 2003/0080544 A1 * | 5/2003 | Rosenkranz | B66F 9/12 | 280/762 |
| 2003/0080545 A1 * | 5/2003 | Rosenkranz | B25J 19/0075 | 280/762 |
| 2004/0047522 A1 * | 3/2004 | Thibault | D06F 95/002 | 383/86 |
| 2005/0254732 A1 * | 11/2005 | Eisenbarth | B65D 19/02 | 383/16 |
| 2006/0222270 A1 * | 10/2006 | Modena | B65D 88/1612 | 383/38 |
| 2007/0127852 A1 * | 6/2007 | Town | B66C 1/10 | 383/16 |
| 2007/0289682 A1 * | 12/2007 | Young | B65D 65/02 | 150/154 |
| 2008/0264461 A1 * | 10/2008 | Harris | E04H 15/12 | 135/120.1 |
| 2009/0294446 A1 * | 12/2009 | DeJulio | B65D 25/16 | 220/254.8 |
| 2010/0111449 A1 * | 5/2010 | Noble | B08B 17/00 | 383/22 |
| 2011/0056519 A1 * | 3/2011 | Card | B08B 17/00 | 134/10 |
| 2011/0127270 A1 * | 6/2011 | Hartman | B65F 1/1615 | 220/495.11 |
| 2011/0148087 A1 * | 6/2011 | Rosenkranz | B60J 11/00 | 280/770 |
| 2012/0325279 A1 * | 12/2012 | Munoz | B08B 15/026 | 135/93 |
| 2013/0306497 A1 * | 11/2013 | Llewellyn | B65D 25/32 | 206/1.7 |
| 2014/0076472 A1 * | 3/2014 | Serlachius | B63B 17/02 | 150/154 |
| 2014/0291193 A1 * | 10/2014 | Heyman | B65D 21/0215 | 206/511 |
| 2015/0314956 A1 * | 11/2015 | Clevenger | B65F 1/1405 | 220/9.2 |
| 2016/0288734 A1 * | 10/2016 | Petiteau | B60R 5/04 | |
| 2016/0368738 A1 * | 12/2016 | Minke | A62B 35/0068 | |
| 2016/0375816 A1 * | 12/2016 | Harrison, Jr. | B60P 3/341 | 296/160 |
| 2017/0008671 A1 * | 1/2017 | Whitman | G06Q 10/0875 | |
| 2018/0305193 A1 * | 10/2018 | Mueller | B66F 17/006 | |
| 2019/0106309 A1 * | 4/2019 | Mueller | B66F 11/04 | |
| 2020/0002955 A1 * | 1/2020 | Christian | H01B 17/56 | |

* cited by examiner

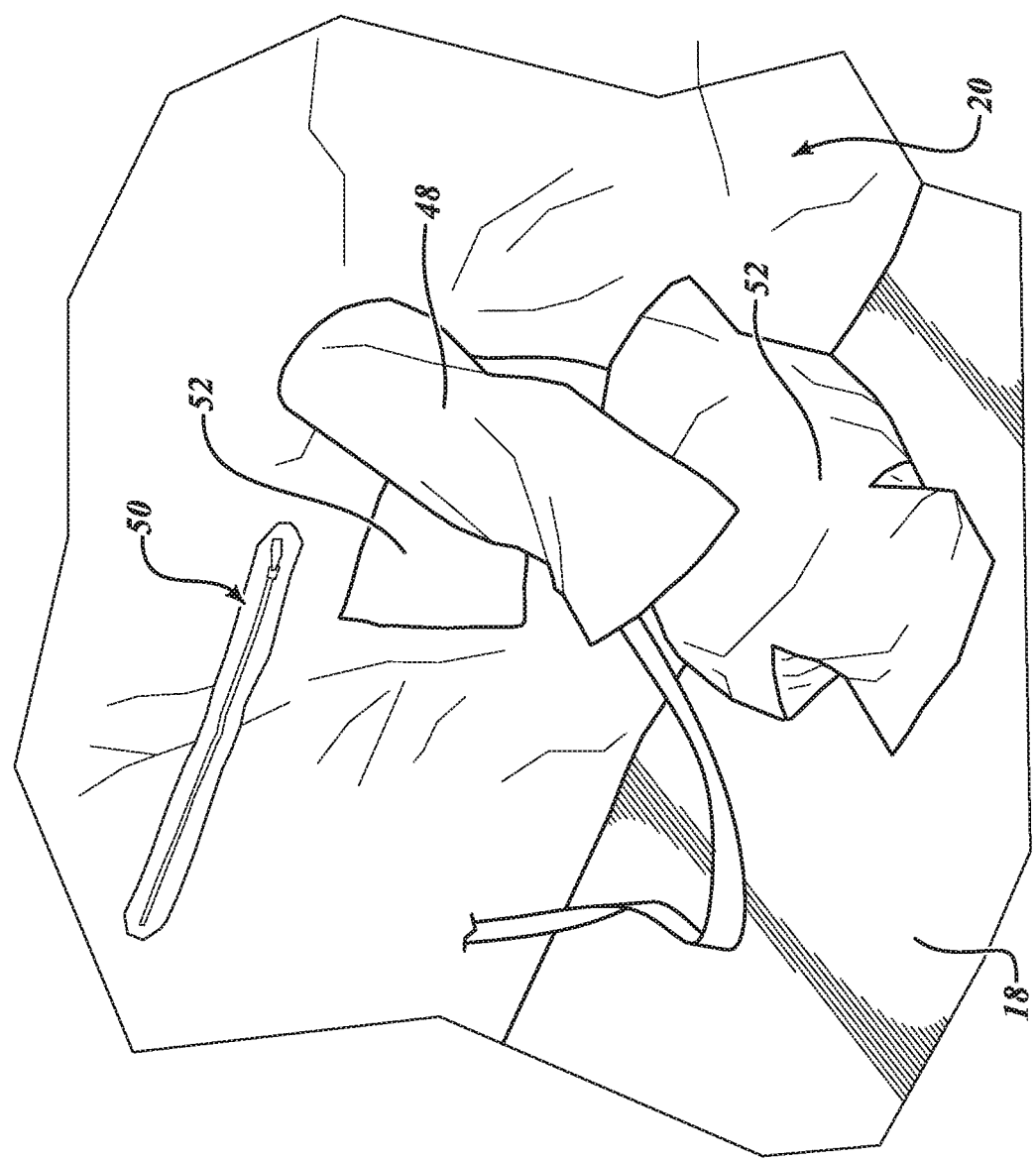

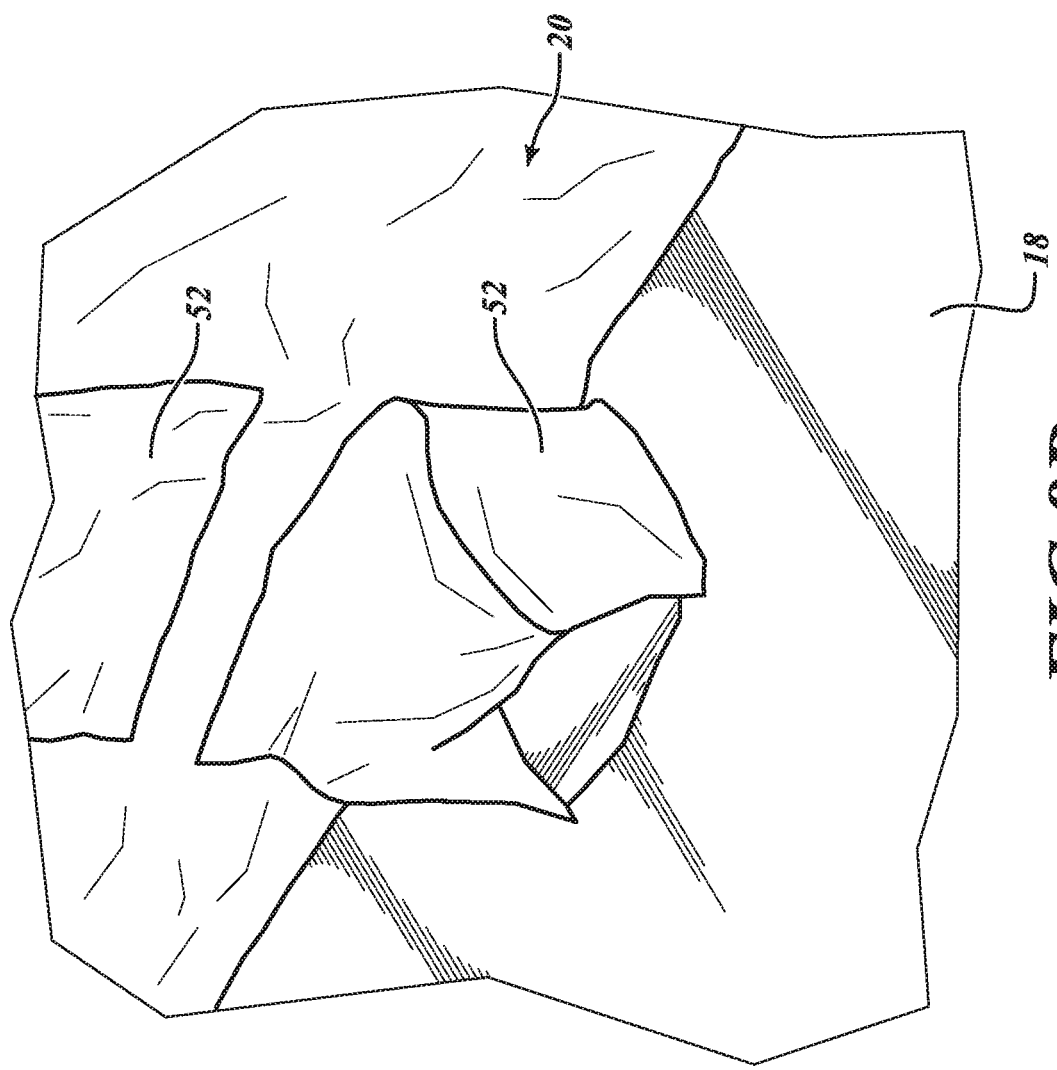

COVER ASSEMBLY FOR BASKET OF AERIAL WORK PLATFORM

CROSS-REFERENCE TO RELATED APPLICATIONS

The present application is related to, and claims the benefit of priority of the filing date of, U.S. Provisional Patent Application No. 62/534,190 filed Jul. 18, 2017, which is herein incorporated by reference in its entirety.

TECHNICAL FIELD

The present disclosure relates to accessories for aerial work platforms.

BACKGROUND

An aerial work platform is a mechanical device used to provide temporary access for people or equipment to inaccessible areas, usually at height. Aerial work platforms are generally used for temporary, flexible access purposes such as maintenance and construction work, such as among other things painting, applying shotcrete, and the like.

One type of aerial work platform is known as a boom lift (sometimes referred to as a "cherry picker"). A boom lift includes a mobile base unit with a boom extending therefrom. The boom may have any number of sections as desired. The sections may be articulating or telescoping.

A basket is attached to the end of the boom. In a typical boom lift, a mounting bracket is attached to the end of the boom. A vertical member extends vertically downwardly from the mounting bracket. Horizontal members (such as forks) extend horizontally from the vertical member. The basket is attached, such as by being bolted, onto a distal end of the horizontal members.

The basket includes guard rails and a control panel for controlling functions such as raising and lowering the basket, rotating the basket, driving and steering the mobile base unit, and the like. The basket also includes a floor. A foot-operated master switch for the control panel is mounted on the floor. The floor typically is made from an expanded metal grate. Decals are attached to various surfaces of the basket to convey information, cautions, and warnings, and to identify various features. Various hardware and/or tools may be contained in the basket.

However, if paint, shotcrete, or the like were to be sprayed, drift, spilled, applied, or leak into or onto the basket, then the paint, shotcrete, or the like may get onto the basket, control panel, master switch, or decals. In some such cases, the the paint, shotcrete, or the like may cover the decals and may hinder their readability. In some such cases, the paint, shotcrete, or the like may foul the hardware and/or the master switch and may hinder their workability. In some such cases, the paint, shotcrete, or the like may cover the control panel and may hinder its operability. In addition, if any of such materials simply were to get onto the basket, then the mere presence of these materials on the basket could contribute to a reduction in the aesthetic attractiveness of the basket, thereby helping contribute to a reduction in the overall value of the aerial work platform.

SUMMARY

Disclosed embodiments include cover assemblies for baskets of aerial work platforms and methods of fabricating a cover assembly for a basket of an aerial work platform.

In an illustrative embodiment given by way of non-limiting example, a cover assembly for a basket of an aerial work platform includes a flexible cover. The flexible cover includes an interior guardrail portion and an exterior guardrail portion. The interior guardrail portion is configured to be received adjacent an interior surface of a guardrail of a basket of an aerial work platform. The exterior guardrail portion surrounds the interior guardrail portion, and the exterior guardrail portion is configured to be received adjacent an exterior surface of a guardrail of a basket of an aerial work platform. A retrieval mechanism is configured to draw the exterior guardrail portion toward the interior guardrail portion.

In another illustrative embodiment given by way of non-limiting example, a non-limiting, illustrative method includes: disposing an interior guardrail portion of a cover adjacent an interior surface of a guardrail of a basket of an aerial work platform; and disposing an exterior guardrail portion of the cover adjacent an exterior surface of a guardrail of a basket of an aerial work platform.

In another illustrative embodiment given by way of non-limiting example, a non-limiting, illustrative method of fabricating a cover assembly for a basket of an aerial work platform includes: attaching an interior guardrail portion of a flexible cover, that is configured to be received adjacent an interior surface of a guardrail of a basket of an aerial work platform, to an exterior guardrail portion of the flexible cover that surrounds the interior guardrail portion, the exterior guardrail portion being configured to be received adjacent an exterior surface of a guardrail of a basket of an aerial work platform; and disposing about the exterior guardrail portion a retrieval mechanism configured to draw the exterior guardrail portion toward the interior guardrail portion.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the text (e.g., claims and/or detailed description) and/or drawings of the present disclosure.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIGS. 6A-6C illustrate details of a safety harness tube of the cover assembly of FIG. 1.

FIGS. 8A-8D illustrate details of feature covers of the cover assembly of FIG. 1.

The use of the same symbols in different drawings typically indicates similar or identical items unless context dictates otherwise.

DETAILED DESCRIPTION

Figure 1:
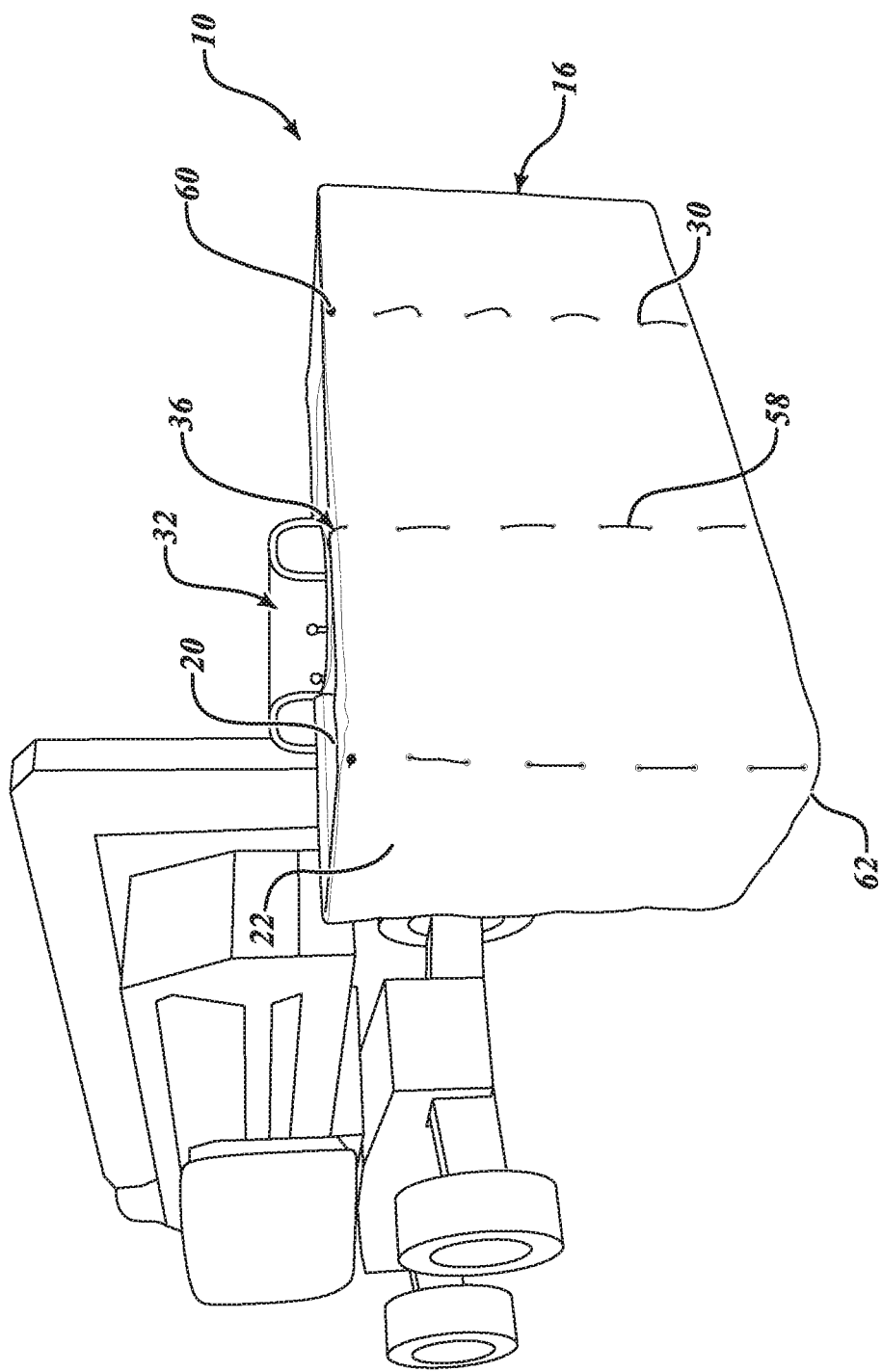
FIG. 1 is a perspective view of an illustrative cover assembly covering a basket of an aerial work platform.
Figure 2:
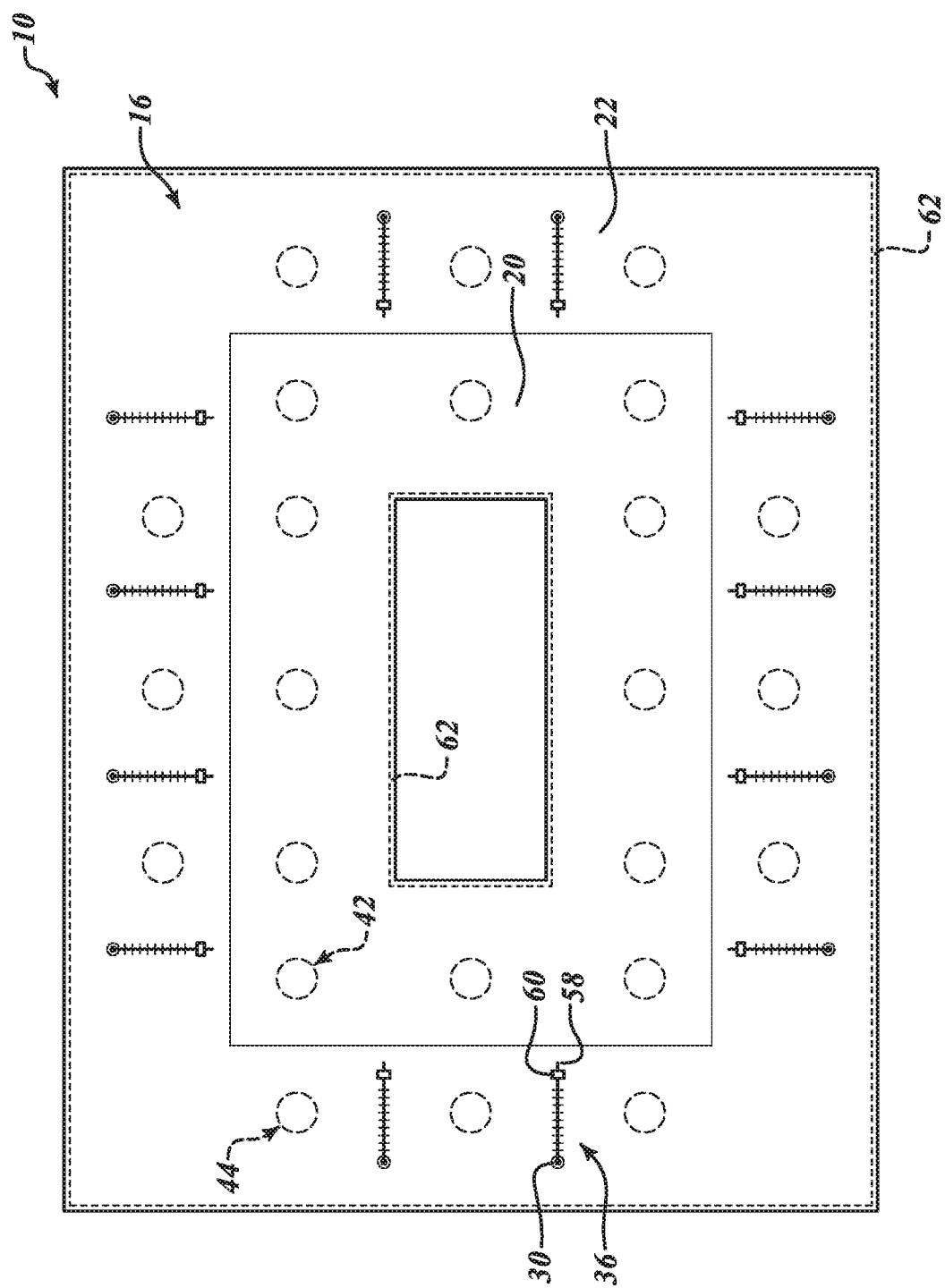
FIG. 2 is a top plan view in partial schematic form of an embodiment of the cover assembly of FIG. 1.

Given by way of non-limiting overview and referring to FIGS. 1 and 2, an illustrative cover assembly 10 for a basket 12 of an aerial work platform 14 includes a flexible cover 16. The flexible cover 16 includes an interior guardrail portion 20 and an exterior guardrail portion 22. The interior guardrail portion 20 is configured to be received adjacent an interior surface 26 of a guardrail 28 of the basket 12. The exterior guardrail portion 22 surrounds the interior guardrail portion 20, and the exterior guardrail portion 22 is configured to be received adjacent an exterior surface 34 of the guardrail 28. A retrieval mechanism 36 is configured to draw the exterior guardrail portion 22 toward the interior guardrail portion 20.

Still by way of overview, in various embodiments the cover assembly 10 is configured for use with an aerial work platform 14 such as a boom lift (also referred to as a "cherry picker"). As is known, the aerial work platform 14 may be used for temporary, flexible access purposes such as maintenance and construction work. As such, workers in the basket 12 may perform tasks such as, without limitation, painting, applying shotcrete, and the like. If paint, shotcrete, or the like were to be sprayed, drift, spilled, poured, applied, or leak into the basket 12, then the paint, shotcrete, or the like will coat the cover assembly 10. Thus, the cover assembly 10 can help reduce the likelihood that the paint, shotcrete, or the like may get onto the basket 12, control panel 32, master switch (not shown), or decals (not shown). In such cases, the cover assembly 10 can help reduce the likelihood that the the paint, shotcrete, or the like may cover the decals and hinder their readability, may foul the hardware and/or the master switch and hinder their workability, and/or may cover the control panel 32 and hinder its operability. Also in such cases, the cover assembly 10 can help reduce the likelihood that any of such materials simply get onto the basket 12, thereby helping to reduce likelihood and/or magnitude of a reduction in the aesthetic attractiveness of the basket 12 and, as a result, thereby helping reduce contribution to a reduction in the overall value of the aerial work platform 14.

Details will be set forth below by way of illustrative examples and not of limitation.

Figure 3:
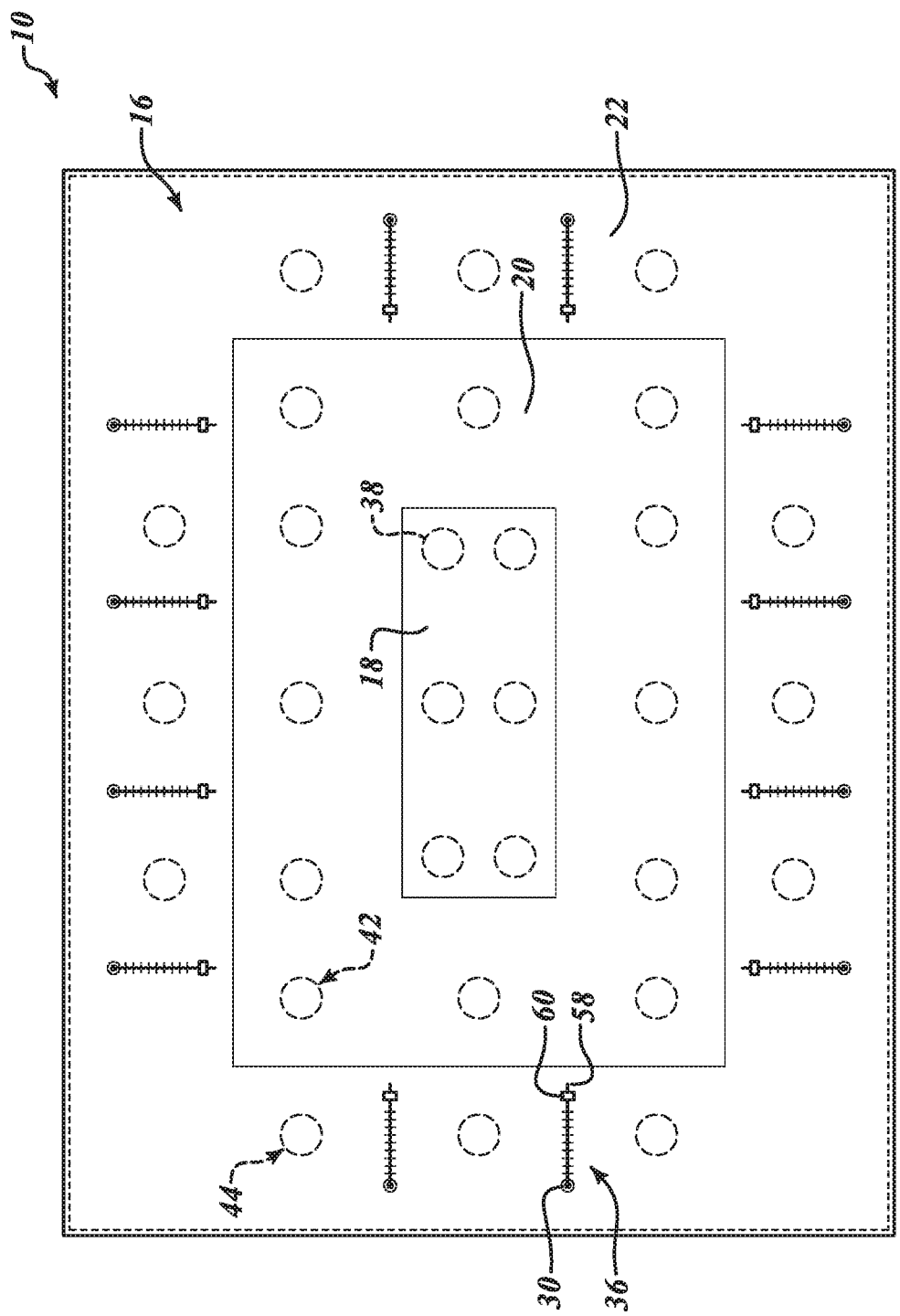
FIG. 3 is a top plan view in partial schematic form of another embodiment of the cover assembly of FIG. 1.

In some embodiments and referring now to FIGS. 1 and 3, the flexible cover 16 may include an optional bottom portion 18, if desired. In such embodiments, the bottom portion 18 is configured to be received on a floor 24 of the basket 12. Also, in such embodiments, it will be appreciated that the interior guardrail portion 20 surrounds the bottom portion 18.

In some other embodiments and referring now to FIGS. 1 and 2, when the optional bottom portion 18 is not provided the interior guardrail portion 20 and the exterior guardrail portion 22 may each include a hem 62. The hem 62 may be weighted or may not be weighted, as desired for a particular purpose. In some embodiments, the hem 62 may be weighted, thereby providing weight in addition to the weight of the cover assembly 10 itself at the bottom of each of the the interior guardrail portion 20 and the exterior guardrail portion 22. The additional weight can help keep the cover assembly 10 gravitationally urged downwardly sufficiently such that the cover assembly 10 can remain in place when disposed over the basket 12. In some other embodiments, the hem 62 need not be weighted. In some of these non-weighted embodiments, one or more magnets (not shown) may be disposed in the hem 62 by a process such as without limitation radiofrequency (RF) welding or sewing, as appropriate. In such embodiments, the magnets disposed in the hem 62 can help hold the interior guardrail portion 20 and/or the exterior guardrail portion 22 onto the basket 12.

Referring now to FIGS. 1-3, in various embodiments the flexible cover 16 may be made from a flexible material such as, without limitation, vinyl or a vinyl-coated fabric. The fabric that is coated with vinyl may be referred to as a base fabric and may include, by way of illustration only and not of limitation, a synthetic woven material, woven nylon, woven polyester, and/or polyester. It will be appreciated that the base fabric may come in different weights and/or strand thicknesses as desired for a particular application. In such embodiments, the optional bottom portion 18 (when provided) and the interior guardrail portion 20 may be attached by radiofrequency welding, and the interior guardrail portion 20 and the exterior guardrail portion 22 may be attached by radiofrequency welding. Also, in some of these embodiments in which the optional bottom portion 18 is provided, the optional bottom portion 18 may define therein drainage openings 38. For example, in applications in which shotcrete is applied, shotcrete may build up on the bottom portion 18. In embodiments in which the drainage openings 38 are provided, shotcrete may drain out of the bottom portion 18 via the drainage openings 38, thereby helping reduce buildup of shotcrete on the bottom portion 18.

In various other embodiments, the flexible cover 16 may be made from a flexible material such as, without limitation, cotton of any thickness as desired for a particular application. Such materials may be used when the cover assembly 10 is intended to be used in conjunction with applications when the aerial work platform 14 will be used in support of painting operations. It will be appreciated that such applications may be appropriate for use of such materials because paint will dry on materials such as cotton (but may not dry on other materials, such as those discussed above, that may be used for the cover 16). In such embodiments, the optional bottom portion 18 (when provided) and the interior guardrail portion 20 may be attached by sewing, and the interior guardrail portion 20 and the exterior guardrail portion 22 may be attached by sewing.

Figure 4:
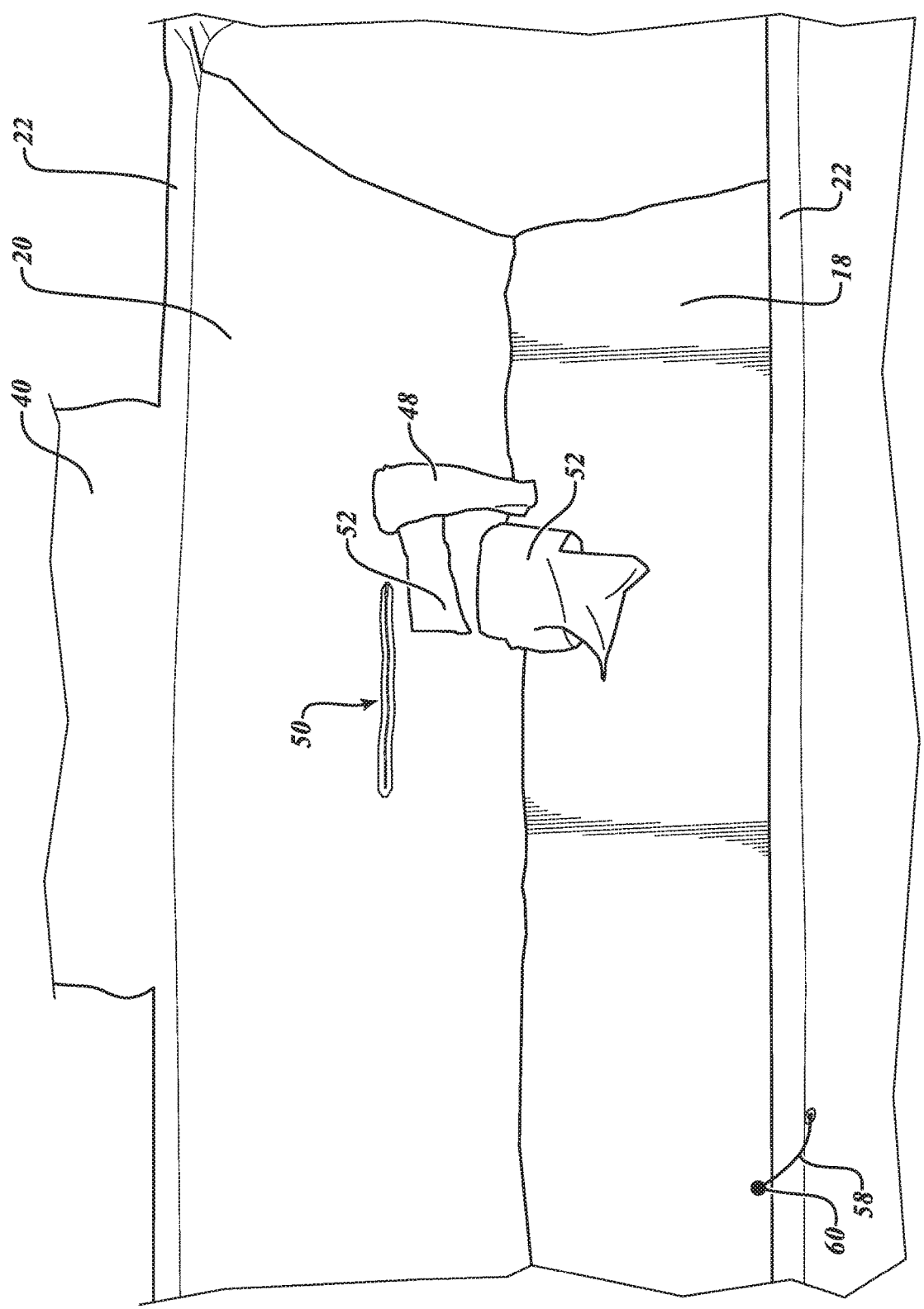
FIG. 4 illustrates details of features of the cover assembly of FIG. 1.
Figure 5:
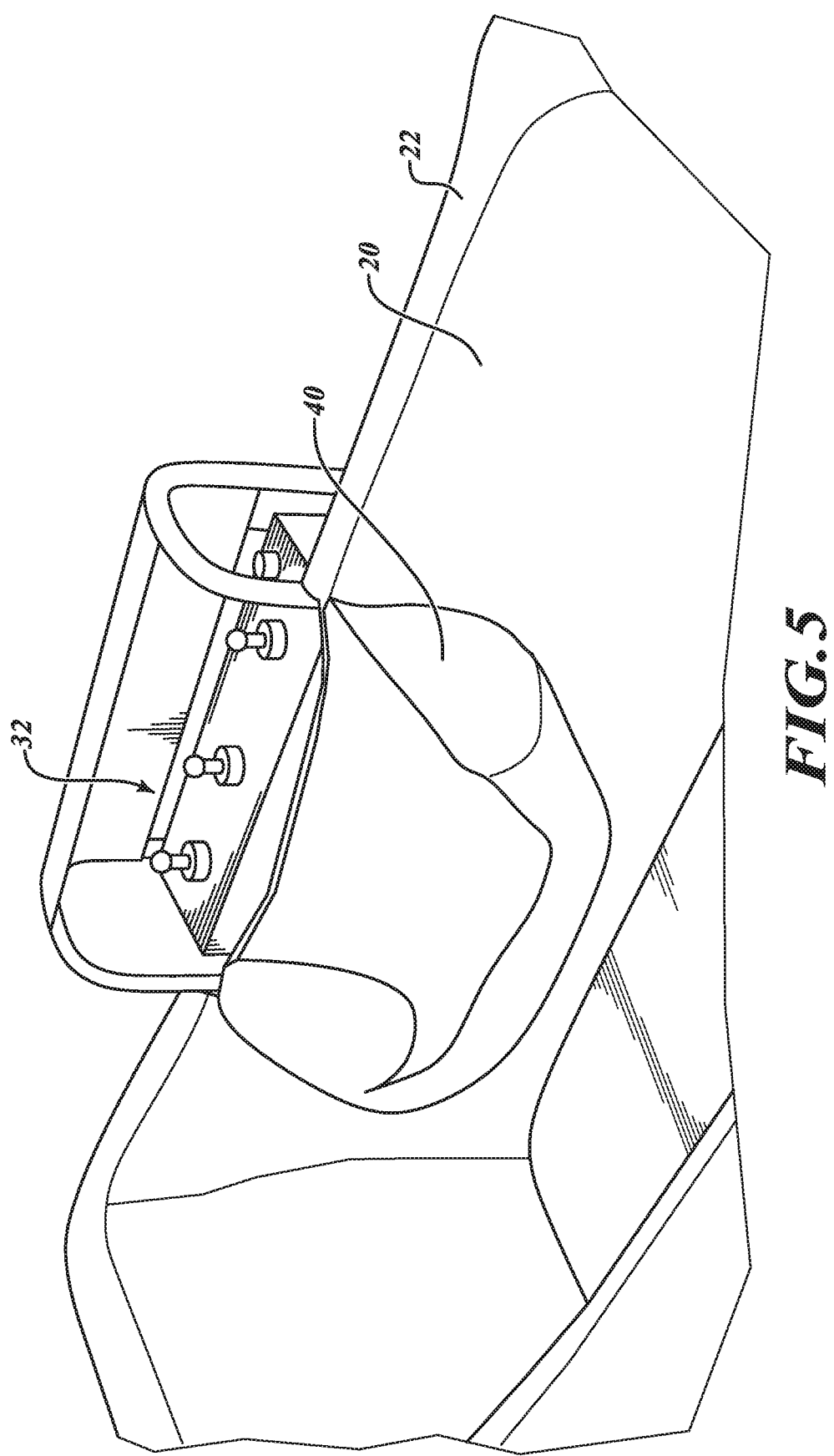
FIG. 5 illustrates details of a control panel cover of the cover assembly of FIG. 1.

Referring additionally to FIGS. 4 and 5, in various embodiments a control panel cover 40 may be removably attached to a control panel 32. As shown in FIG. 5, the control panel cover 40 may be removed from the control panel 32 when the control panel 32 is accessed by an operator to control the aerial work platform 14. The control panel cover 40 may be put in place to cover the control panel 32 during performance of construction and/or maintenance procedures and the aerial work platform is not being controlled via the control panel 32.

Still referring to FIGS. 1-5, in various embodiments the retrieval mechanism 36 may include drawstrings 58 that are disposed about the exterior guardrail portion 22. In such embodiments, each drawstring 58 is fixed along the exterior guardrail portion 22 at a first end of the drawstring 58 and extends along the exterior guardrail portion 22 toward the interior guardrail portion 20. Each drawstring 58 is graspable at a second end thereof by a user. In various embodiments, grommets 30 are disposed in the exterior guardrail portion 22 in a substantially linear manner, and each drawstring 58 is threadedly received through the grommets 30. A knot is provided in the first end of each drawstring 58. Each drawstring 58 is adjustably received in a cord stop 60 between the second end of the drawstring 58 and the grommet 30 that is nearest the second end of the drawstring 58. To raise the exterior guardrail portion when desired, a user grasps the drawstring 58 toward the second end, opens the cord stop 60, and pulls the drawstring 58 upwardly through the opened cord stop 60. The knot at the first end of the drawstring 58 engages its grommet 30, thereby drawing the exterior guardrail portion 22 upwardly. When the user has completed drawing upwardly the drawstring 58, the user closes the cord stop 60, thereby holding the exterior guardrail portion 22 in place. It will be appreciated that any number of grommets 30 and drawstrings 58 may be provided as desired for a particular application.

As shown in FIGS. 2 and 3, in various embodiments the interior guardrail portion 20 may define therein openings 42 and the exterior guardrail portion 22 may define therein openings 44. In such embodiments, each of the openings 42 is alignable with an associated opening 44 when the cover 16 is disposed over the basket 12. The openings 42 and 44 may be defined as holes or flaps, as desired. When the openings 42 are aligned with the openings 44, wind may pass through the aligned openings 42 and 44. Passage of wind through aligned openings 42 and 44 can help reduce effect of wind on the basket 12 (with the cover assembly 10 disposed thereon). Any number of openings 42 and 44 may be provided as desired, and the openings 42 and 44 may have any size or shape as desired. The openings 42 and 44 may entail any amount of the surface area of the interior guardrail portion 20 and the exterior guardrail portion 22, respectively, as desired. It will be appreciated that the greater the surface area of the interior guardrail portion 20 and the exterior guardrail portion 22 via the openings 42 and 44, respectively, then the greater amount of wind that may pass through the openings 42 and 44, thereby helping reduce effect of wind on the basket 12 (with the cover assembly 10 disposed thereon). It will also be appreciated that, conversely, the greater the surface area of the interior guardrail portion 20 and the exterior guardrail portion 22 via the openings 42 and 44, respectively, may result in a reduction in contiguous surface area of the interior guardrail portion 20 and the exterior guardrail portion 22, which may in turn result in a reduction in efficacy of the cover 16 from preventing paint, concrete, or the like from coating various portions of the basket 12.

Figure 6B:
Figure 6C:

Referring additionally to FIGS. 6A-6C, a worker in the basket 12 may be required by applicable safety regulations to wear a harness that is attached to the basket 12 (such as via a tie-off point). To that end, in various embodiments the interior guardrail portion 20 may define access ports 46. In such embodiments, each access port 46 is configured to permit passage through the interior guardrail section 20 of a harness for attachment to a tie-off point on the basket 12. In some such embodiments, one or more of the access ports 46 may include a tube 48 that is configured to cover at least a portion of a harness receivable therein.

Figure 7A:
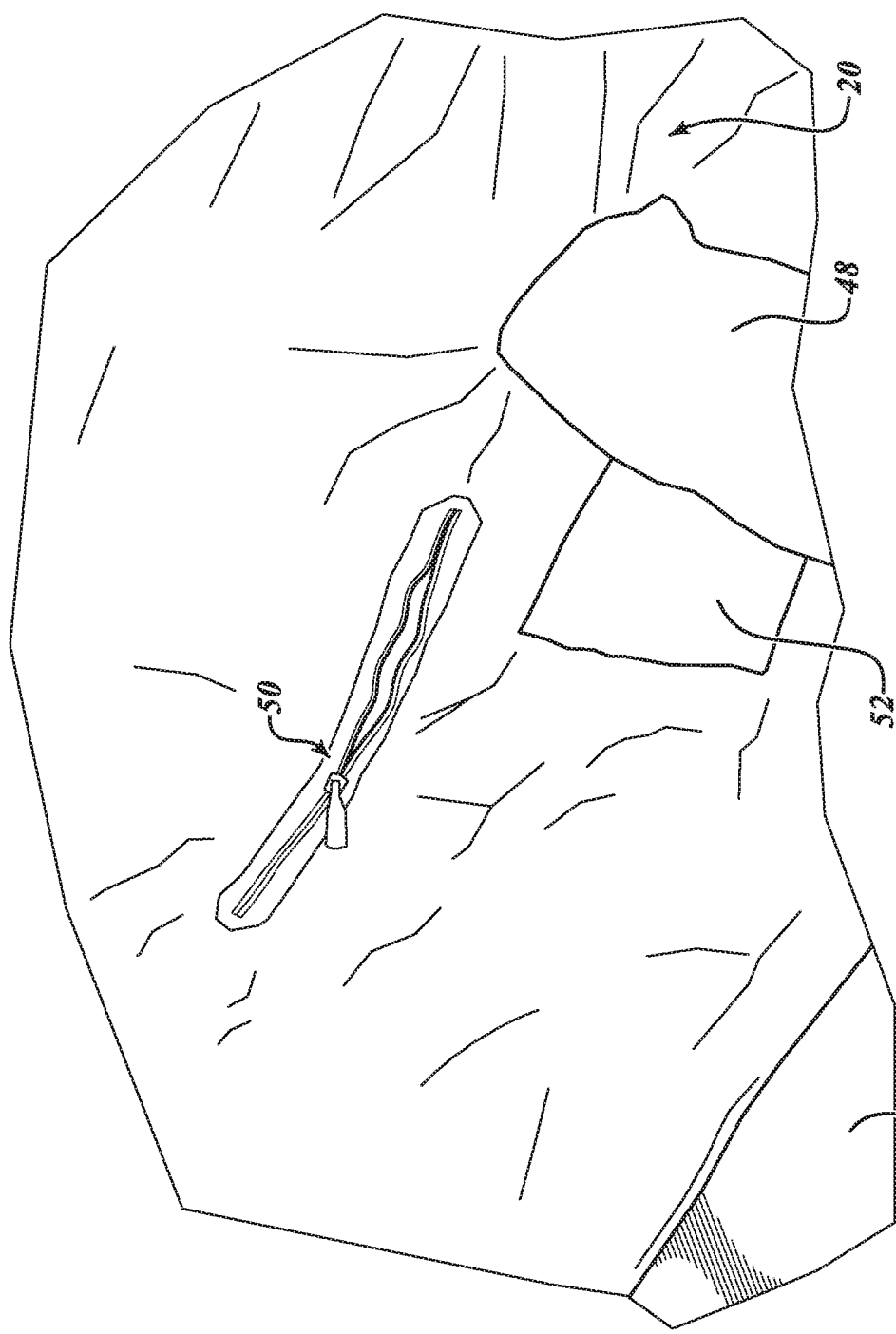
FIGS. 7A-7B illustrate details of an openable closure of the cover assembly of FIG. 1.
Figure 7B:
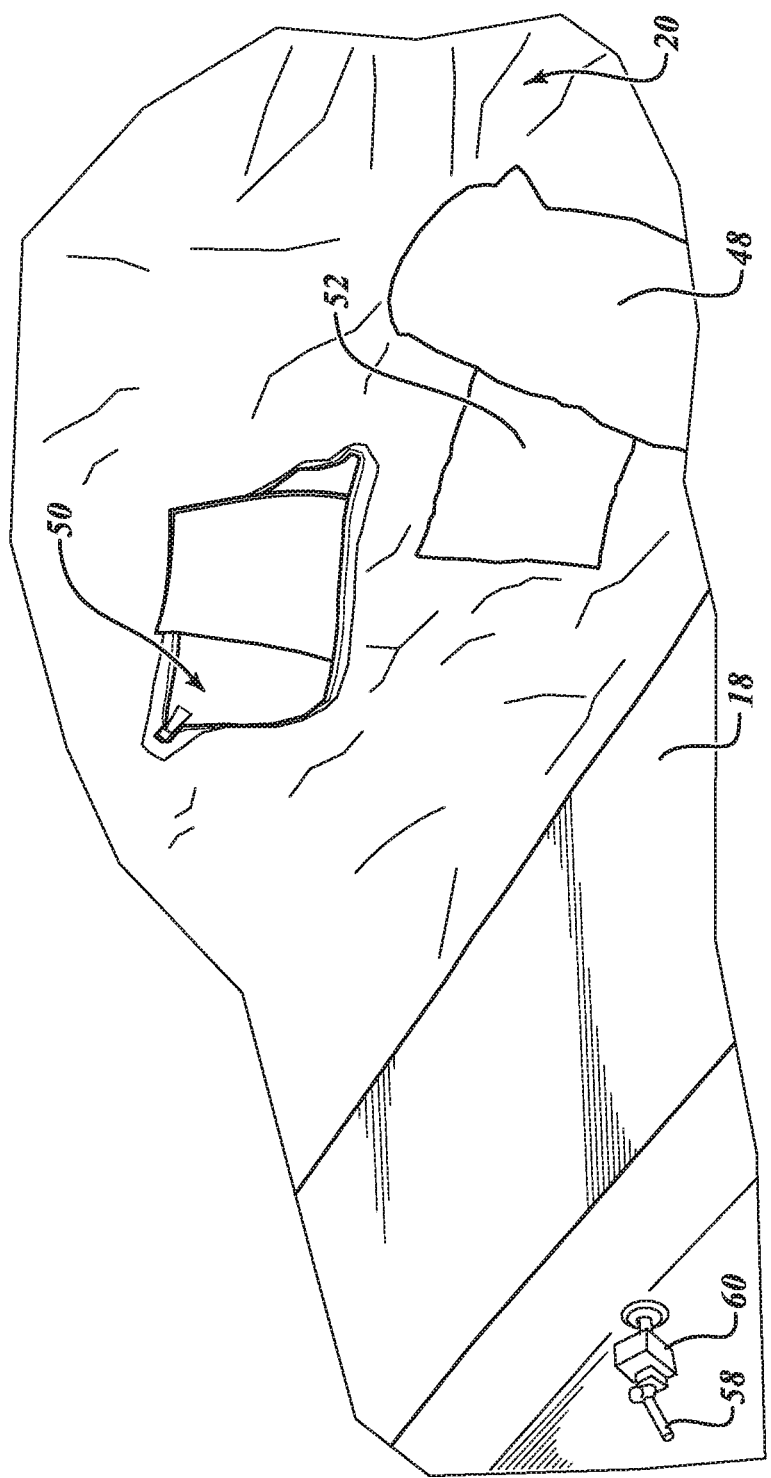
Figure 8A:
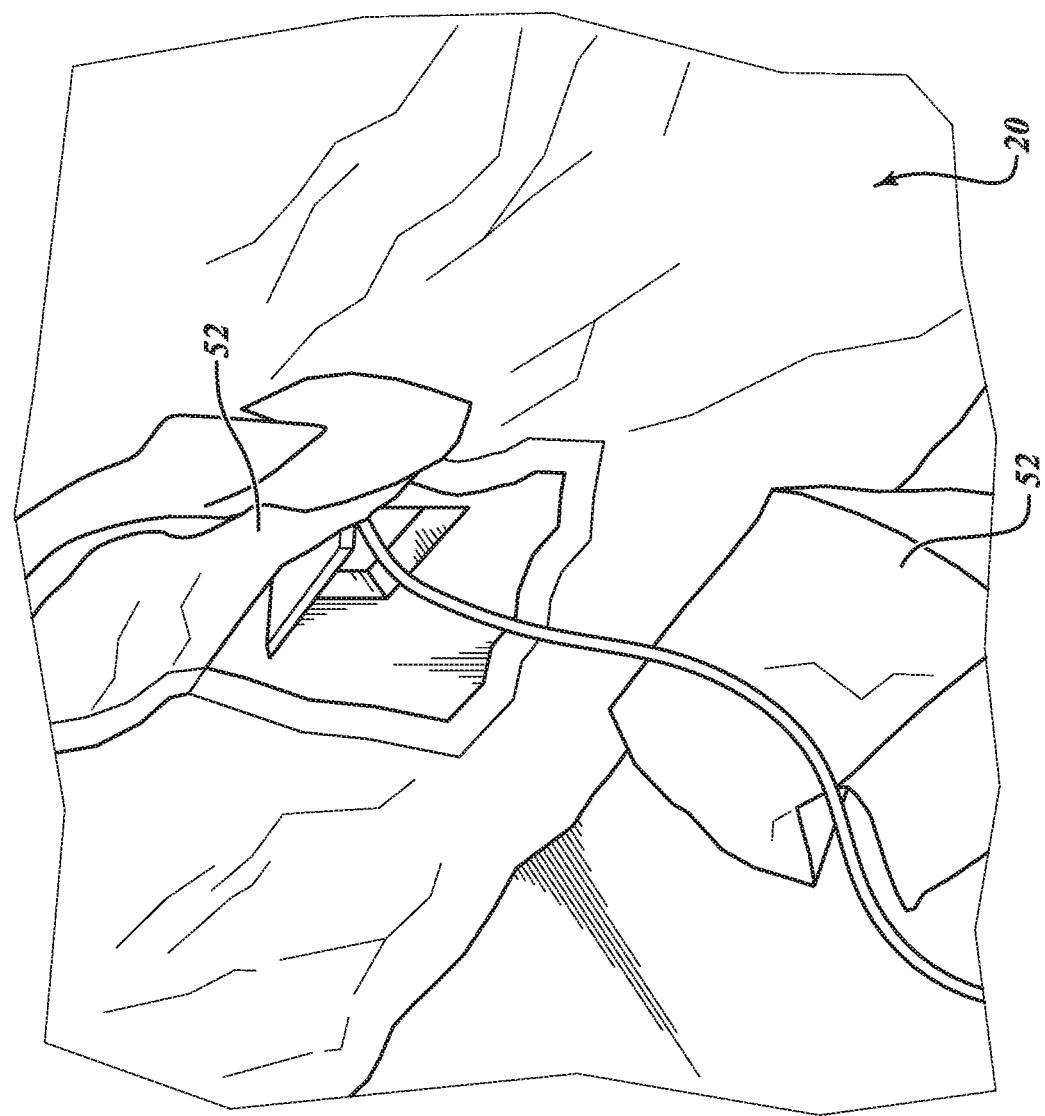
Figure 8B:
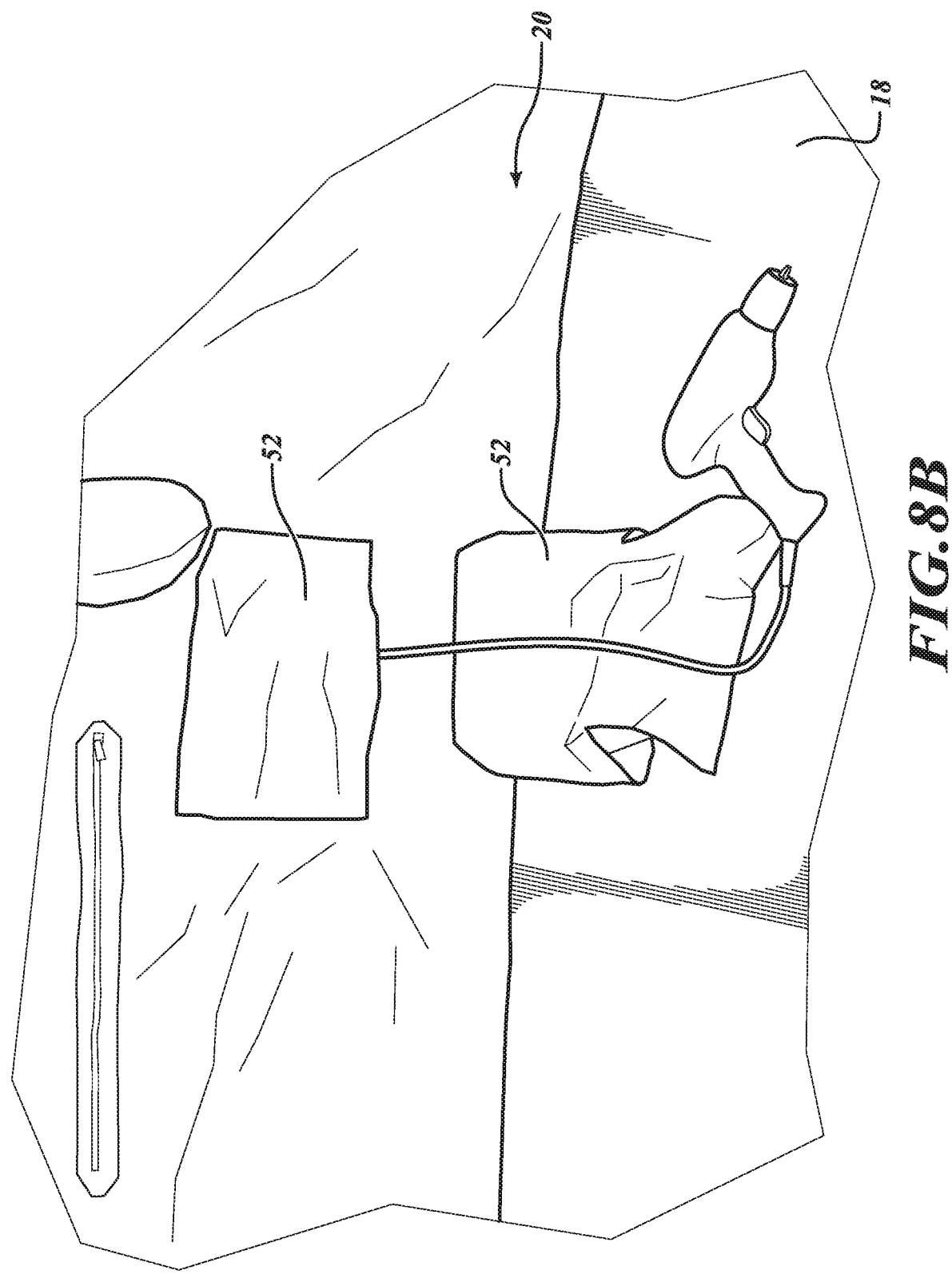
Figure 8C:
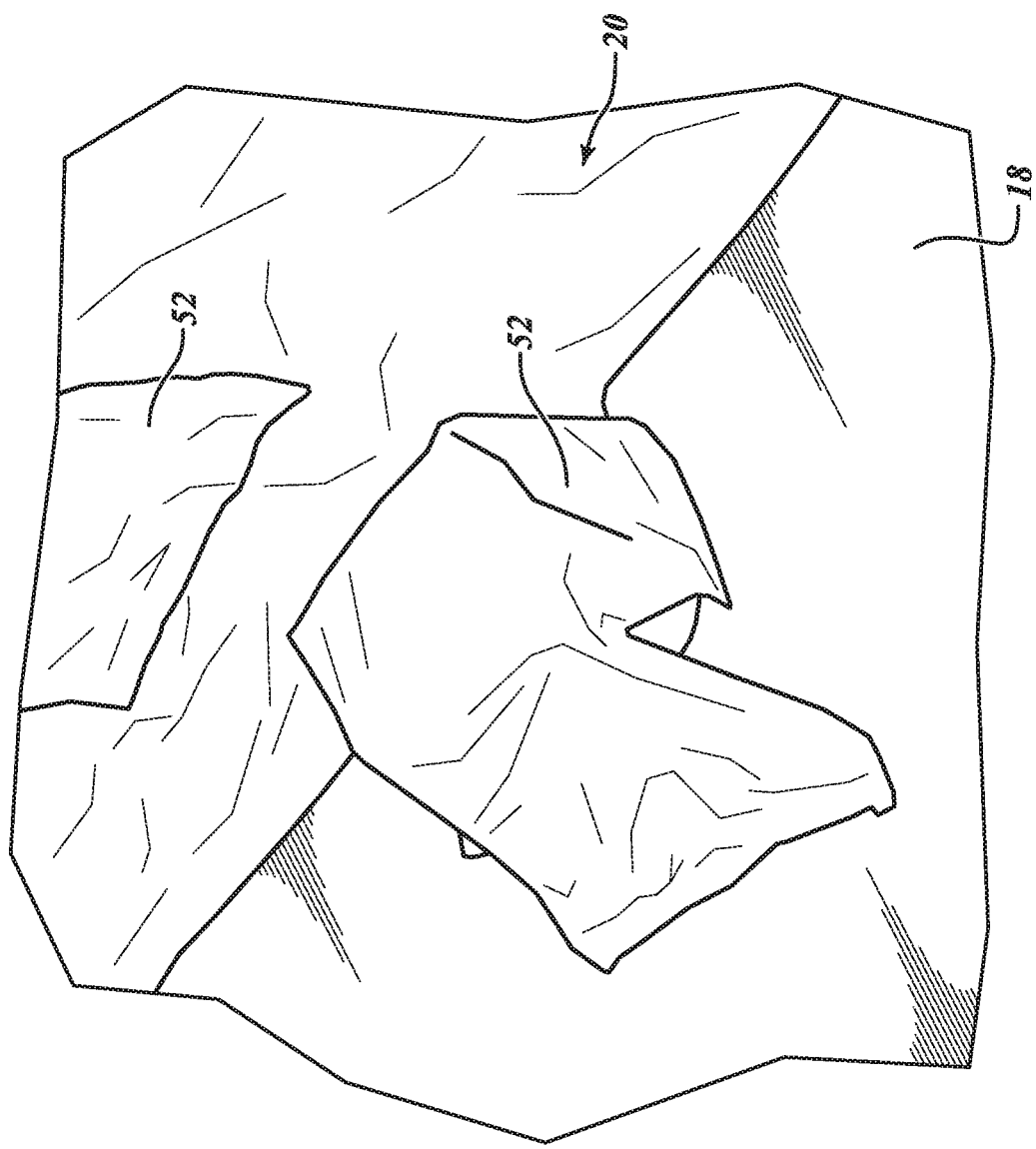

Referring additionally to FIGS. 7A-7B and as also shown in FIG. 4, in various embodiments, the interior guardrail portion 20 may include at least one openable closure 50, such as without limitation a zipper, hook and loop fasteners, snaps, hook and eye fasteners, buttons, and the like. In such embodiments, each openable closure 50 is alignable with a storage compartment associated therewith and is configured to permit access to its associated storage compartment. It will be appreciated that the storage compartments may store items such as, without limitation, operating manuals, maintenance manuals, tools, parts, consumables, and the like.

Referring additionally to FIGS. 8A-8D and as also shown in FIG. 4, in various embodiments one or more removably attachable feature covers 52 may be provided as desired. Each feature cover 52 is configured to cover a feature associated with the feature cover 52. The features that may be covered by an associated feature cover 52 may include, without limitation, an electrical outlet, a master switch, and the like. In some such embodiments, one or more magnets (not shown) may be disposed in an associated feature cover 52, such as by RF welding or sewing, as appropriate. In such embodiments, the magnets can help hold the feature cover 52 to a desired portion of the basket 12, such as the floor 24 or the interior surface 26.

In various embodiments, one or more magnets (not shown) may be provided. In such embodiments, the magnets are disposed in the the bottom portion 18 (when provided), the interior guardrail portion 20, and/or the exterior guardrail portion 22 such as by RF welding or sewing, as appropriate. In these embodiments, the magnets are configured to hold the bottom portion 18 (when provided), the interior guardrail portion 20, and/or the exterior guardrail portion 22 onto an associated portion of the basket 12, such as the floor 24, or the interior surface 26, or the exterior surface 34, respectively.

Now that various embodiments of the cover assembly 10 have been described, illustrative methods of their operation and fabrication will be described by way of nonlimiting examples.

Various embodiments of the cover assembly 10 operate as follows. To that end, an illustrative method of covering a basket of an aerial work platform with a cover assembly is explained by way of the following nonlimiting example.

As a preliminary step, a cover may be unfolded and rolled out onto a surface, such as the ground or a floor.

In an optional step, when provided an optional bottom portion of the cover is disposed onto a floor of the basket. If desired, the bottom portion of the cover may be straightened. Any desired workpieces (such as without limitation a paint sprayer, buckets of paint, other supplies, tools, consumables, and the like) may be loaded onto the bottom portion of the cover. A user may then enter the basket.

Regardless of whether or not the bottom portion is provided, an interior guardrail portion of the cover is disposed adjacent an interior surface of a guardrail of the basket. In an optional step, if provided the optional bottom portion of the cover may be straightened again. The exterior guardrail portion of the cover is disposed adjacent an exterior surface of the guardrail of the basket.

In various embodiments, a control panel cover may be removably attached onto a control panel of the aerial work platform.

In various embodiments, first openings in the interior guardrail portion may be aligned with associated second openings in the exterior guardrail portion when the cover is disposed over the basket. As discussed above, when the first openings are aligned with the second openings, wind may pass through the aligned second and second openings.

In various embodiments, each of at least one openable closure included in the interior guardrail portion may be aligned with a storage compartment associated therewith. As discussed above, alignment of an openable closure with an associated storage compartment can permit access to the associated storage compartment.

In various embodiments, each of at least one removably attachable feature cover may be removably attached onto the interior guardrail portion such that an associated feature of an aerial work platform is covered. As discussed above, the features that may be covered by an associated feature cover may include, without limitation, an electrical outlet, a master switch, and the like. In some such embodiments and given by way of nonlimiting example, a removably attachable feature cover may be removably attached onto the floor or an interior surface of the guardrail by at least one magnet that is disposed, such as by RF welding or sewing as appropriate, in an associated feature cover.

In various embodiments, the optional bottom portion (if provided), the interior guardrail portion, and/or the exterior guardrail portion may be held onto the basket of an aerial work platform with magnets that are disposed, such as by RF welding or sewing as appropriate, in the optional bottom portion (if provided), the interior guardrail portion, and/or the exterior guardrail portion.

After the basket has been covered with the cover assembly and all desired tasks have been accomplished, the cover assembly may be removed from the basket. Any feature covers and the control panel cover may be removed. The exterior guardrail portion may be drawn toward the interior guardrail portion. For example, in various embodiments free ends of drawstrings (with fixed ends attached to the exterior guardrail portion) may be grasped and lifted upward, thereby drawing the exterior guardrail portion toward the interior guardrail portion. All remaining steps (that were performed to cover the basket) may be performed in reverse order.

Various embodiments of the cover assembly 10 may be fabricated as follows. To that end, an illustrative method of fabricating a cover assembly for a basket of an aerial work platform is explained by way of the following nonlimiting example.

An interior guardrail portion of a flexible cover, that is configured to be received adjacent an interior surface of a guardrail of a basket of an aerial work platform, is attached to an exterior guardrail portion of the flexible cover that surrounds the interior guardrail portion, the exterior guardrail portion being configured to be received adjacent an exterior surface of a guardrail of a basket of an aerial work platform. A retrieval mechanism configured to draw the exterior guardrail portion toward the interior guardrail portion is disposed about the exterior guardrail portion.

In some embodiments, an optional bottom portion of the flexible cover, that is configured to be received on a floor of a basket of an aerial work platform, may be attached to the interior guardrail portion. In some such embodiments, if desired drainage openings may be defined in the bottom portion (when provided).

In various embodiments, the optional bottom portion (when provided) and the interior guardrail portion may be attached by a process such as radiofrequency welding and/or sewing and the interior guardrail portion and the exterior guardrail portion may be attached by a process such as radiofrequency welding and/or sewing.

In various embodiments, a control panel cover that is removably attachable to a control panel of the aerial work platform may be formed.

In various embodiments, disposing a retrieval mechanism about the exterior guardrail portion may include disposing a plurality of drawstrings about the exterior guardrail portion. In such embodiments, disposing a plurality of drawstrings about the exterior guardrail portion may include fixing each of the drawstrings at a first end thereof to the exterior guardrail portion, each of the drawstrings extending along the exterior guardrail portion toward the interior guardrail portion, each of the drawstrings being graspable at a second end thereof by a user.

In various embodiments, first openings may be defined in the interior guardrail portion and second openings may be defined in the exterior guardrail portion. In such embodiments, the first openings are alignable with associated second openings when the cover is disposed over the basket. As discussed above, when the first openings are aligned with the second openings, wind may pass through the aligned second and second openings.

In various embodiments, access ports may be defined in the interior guardrail portion. In such embodiments the access ports are configured to permit passage through the interior guardrail section of a harness for attachment to a tie-off point on the basket.

In various embodiments, at least one openable closure may be disposed in the interior guardrail portion. In such embodiments, each openable closure may be alignable with a storage compartment associated therewith and may be configured to permit access to the associated storage compartment.

In various embodiments, at least one removably attachable feature cover may be provided. In such embodiments, each feature cover is configured to cover an associated feature.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A cover assembly for a basket of an aerial work platform, the cover assembly comprising:
    a flexible cover including:
       an interior guardrail portion configured to be received adjacent an interior surface of a guardrail of the basket of the aerial work platform;
       an exterior guardrail portion that surrounds the interior guardrail portion, the exterior guardrail portion being configured to be received adjacent an exterior surface of the guardrail of the basket of the aerial work platform; and
    a retrieval mechanism configured to draw the exterior guardrail portion in a direction toward the interior guardrail portion, the retrieval mechanism including a plurality of drawstrings disposed on the exterior guardrail portion around the interior guardrail portion, the plurality of drawstrings are arranged lengthwise in the direction toward the interior guardrail portion.

2. The cover assembly of claim 1, further comprising:
    a bottom portion configured to be received on a floor of the basket of the aerial work platform, the interior guardrail portion surrounding the bottom portion.

3. The cover assembly of claim 2, wherein the bottom portion defines therein a plurality of drainage openings.

4. The cover assembly of claim 2, further comprising:
    a plurality of magnets disposed in at least one of the bottom portion, the interior guardrail portion, and the exterior guardrail portion and configured to hold at least one of the bottom portion, the interior guardrail portion, and the exterior guardrail portion, respectively, onto the basket of the aerial work platform.

5. The cover assembly of claim 1, wherein the flexible cover is made from a material chosen from vinyl or a vinyl-coated fabric.

6. The cover assembly of claim 1, wherein the interior guardrail portion and the exterior guardrail portion each include a hem, wherein the hem includes one of a weighted hem and at least one magnet disposed in the hem.

7. The cover assembly of claim 1, further comprising:
    a control panel cover that is removably attachable to a control panel of an aerial work platform.

8. The cover assembly of claim 1, wherein each of the drawstrings is fixed along the exterior guardrail portion at a first end of the drawstring, each of the drawstrings is graspable at a second end thereof by a user.

9. The cover assembly of claim 1, wherein:
the interior guardrail portion defines therein a plurality of first openings; and
the exterior guardrail portion defines therein a plurality of second openings, each of the plurality of first openings being alignable with an associated one of the plurality of the plurality of second openings when the cover is disposed over the basket of the aerial work platform.

\* \* \* \* \*